Patented July 28, 1953

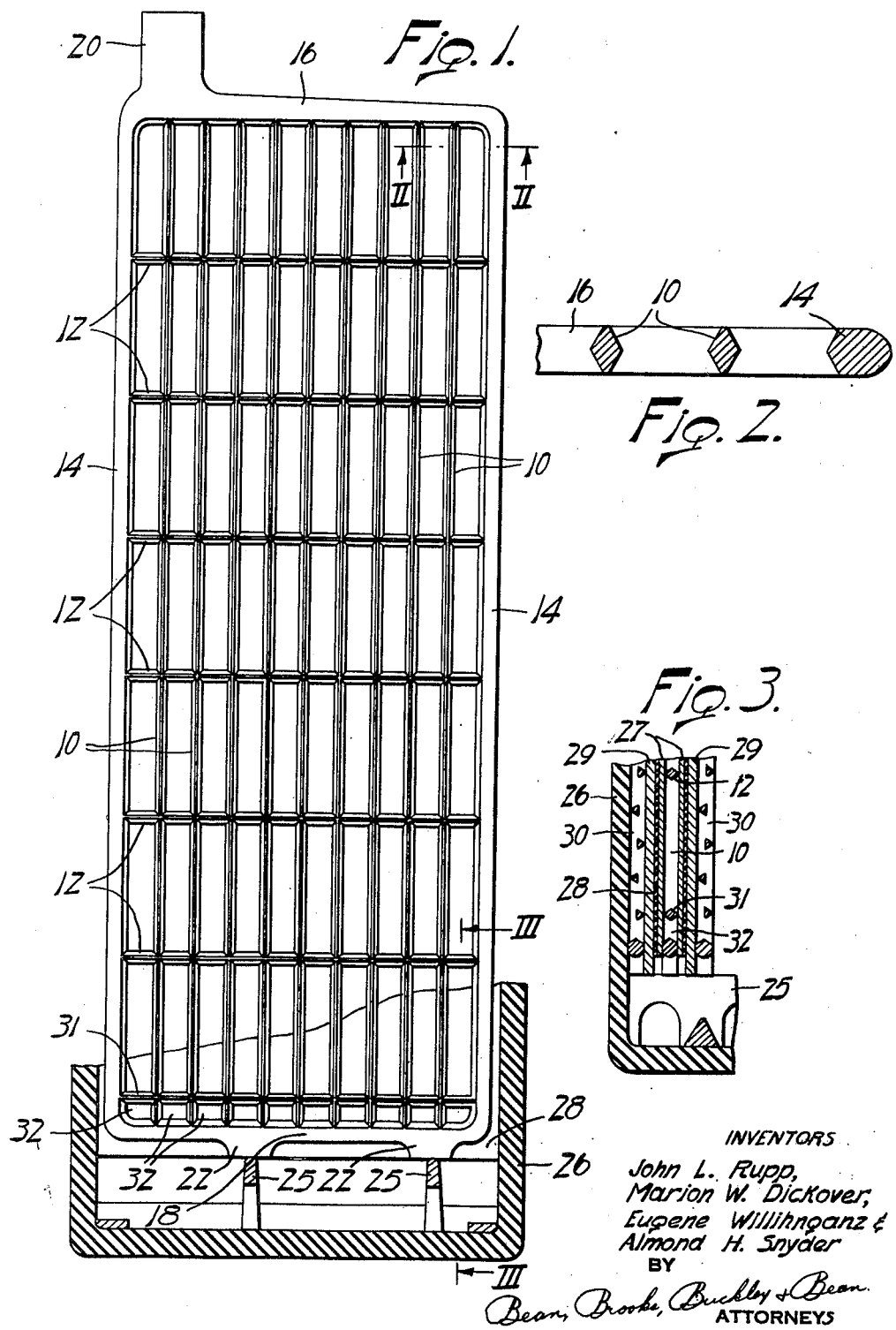

2,647,154

UNITED STATES PATENT OFFICE 2,647,154

STORAGE BATTERY

John L. Rupp and Marion W. Dickover, Williamsville, and Eugene Willihnganz and Almond H. Snyder, Lancaster, N. Y., assignors to National Battery Company, St. Paul, Minn.

Application August 4, 1949, Serial No. 108,548

5 Claims. (Cl. 136—36)

This invention relates to improvements in storage battery grids, and more particularly to an improved form of storage battery grid of the type having vertically elongate paste carrying pockets.

One of the objects of the invention is to provide an improved form of storage battery grid of the vertically elongate paste pocket type which is adapted to give improved results when used for example in combination with grid paste retaining devices of the mat type.

Another object of the invention is to provide in a storage battery of the type employing grid paste retaining mats, an improved form of grid of the vertically elongate paste pocket type which avoids sloughing out and consequent loss of active paste substance from the lower tier of the paste retaining sockets of the grid.

Other objects and advantages of the invention will appear from the specification hereinafter.

In the drawing:

Fig. 1 is an elevation of a positive plate grid of the invention, showing fragmentarily the battery case and grid supporting device in section;

Fig. 2 is a fragmentary section on an enlarged scale taken along line II—II of Fig. 1; and Fig. 3 is a fragmentary section taken along line III—III of Fig. 1.

The invention is illustrated in the drawing as being embodied in the fabrication of a positive plate for a storage battery, and more particularly in the fabrication of a grid of the type having vertically elongate paste holding sockets such as have been found to provide the best ratio of electrical conductivity toward the terminal post to weight of metal forming the grid. Also, the type grid referred to herein lends itself particularly to "vertical pouring" of the grid metal during fabrication of the grid; that is by pouring molten lead into the grid forming mold through an opening at the top terminal end thereof so that the molten lead flows substantially straight downwardly into the mold in the direction of the vertical bars of the grid. Secondarily, portions of the inflowing metal bypass into the relatively short lateral openings in the mold to form the transverse rib portions of the finished grid. Thus, solid formation of the vertical conductor segments leading toward the terminal post is assured while the relatively short transverse rib sections between the vertical conductors are also more readily obtained in solid form.

Thus, as illustrated in the drawing, the grid of the invention is shown as being embodied in a molded fabrication of lead or lead alloy metal such as may be preferably used for the purpose of constructing the battery grid; the grid comprising relatively long vertically extending rib sections 10 which intersect at intervals with relatively short transverse rib sections 12; the grid formation being bounded by relatively heavier side strands 14—14; a top strand 16; and a bottom strand 18. The grid terminal post 20 is molded integrally with the top strand 16, and supporting feet 22—22 are formed integrally with the bottom strand 18 and are shown in the drawing as supporting the grid in elevated position upon a support bracket 25 which rests against the bottom of the battery case 26. As illustrated in Figs. 2-3, the ribs 10—12 are substantially diamond-shaped in cross section thereby being adapted to key into the active paste pellets therebetween so as to resist dislodgment thereof from the grid.

In the following description by such terms as "relatively short distance," "relatively closely spaced" and "relatively short," when relating to the lowermost horizontal rib at the bottom of the grid is meant that the distance between the guard rib element and the bottom strand portion is not more than one-half the average distance between the other horizontal ribs.

As illustrated in Fig. 3, the grid of the invention is particularly adapted for use in conjunction with active paste retainer means of the mat or wrap around types; a fiber glass mat type retainer being illustrated at 27—27 enclosed within a punched rubber envelope 28. Wood separators 29 are then shown as being disposed at opposite sides of the envelope 28, and the negative plates of the cell are designated 30. Such type paste retainers are well known in the art, and may be constructed for example of matted glass fibers or the like. In any case such retainers must of course be sufficiently porous to permit electrolyte circulation and current flow therethrough. Whereas, such mat devices are intended to bear against the opposite sides of the paste carrying grid and to remain in paste-retaining bearing relation thereagainst throughout the vertical extent of the grid, the lower edges of the mats in time fray off and/or buckle so as to expose the lower ends of the bottom tier of active paste pellets. Inasmuch as the active paste material is comprised of discrete particles, the exposure of the pellets at the lower ends thereof invariably results in sloughing out of the active paste material from the entire grid pocket so exposed; the material running into the sediment space in the bottom of the battery case. Thus, it will be appreciated that whenever the above described situation arises the battery capacity is depleted not only because of the loss of effectiveness of the lower tier of active paste pellets, but also because of the blocking of the circulation space under the pack of grids which must be maintained in open condition in order to obtain efficient operation of the battery.

The present invention avoids the disadvantages and difficulties recited hereinabove by providing in addition to the conventionally arranged transverse rib elements 12 a "safeguard" rib element such as is indicated at 31. The "safeguard" rib element 31 is characterized by being disposed to extend transversely of the grid structure at only a relatively short distance above the elevation of the bottom strand portion 18 of the grid member, whereas the other transverse grid elements 12 are relatively spaced in vertical directions of the grid at much more substantial distances apart. Therefore, the "safeguard" rib 31 defines in combination with the relatively closely spaced bottom strand 18 a series of vertically short active paste retaining pockets as are designated 32 (Figs. 1 and 3). Because of their relatively short vertical extent the pockets 32 not only function to avoid spillage of substantial amounts of active paste whenever they do spill, such as would be lost from the pockets defined between the conventionally spaced transverse ribs 12; but also the pockets 32 operate with improved facility in view of their reduced vertical extents to prevent dislodgment of any amount of active paste material therefrom.

Thus, it will be appreciated that the invention provides in combination with the electrically efficient vertically elongate active paste pellet arrangement improved means for preventing dislodgment and loss of active paste material from the lower tier of pellets thereof; and that likewise the invention prevents undesirable dislodgment of active paste material such as would tend to block the circulation space within the bottom of the battery case such as is required for optimum battery operation.

It will of course be appreciated that although only one form of the invention has been shown and described in detail, it will be apparent to those skilled in the art that the invention is not so limited but that various changes may be made therein without departing from the spirit of the invention or the scope of the appended claims.

What is claimed is:

1. In a storage battery, an active paste carrying grid, comprising a molded metal fabrication including vertical and transverse rib elements defining vertically elongate active paste pockets therebetween, said rib members being framed within opposite side and top and bottom metal strand portions outlining said grid, and a paste guard rib member disposed to substantially bridge the thickness of strand portions and extending substantially parallel to the bottom strand portion, said guard rib member being separated from said bottom strand portion a distance less than one-half the average distance between other transverse rib elements, whereby said guard rib retards the sloughing loss of paste from the lower portion of the grid.

2. In a storage battery, an active paste carrying grid, comprising a molded metal fabrication including vertical and transverse rib elements defining tiers of vertically elongate active paste pockets throughout the upper and major portion of said grid extent, said rib members being framed within opposite side and top and bottom metal strand portions outlining said grid, and a bottom tier of vertically short horizontally elongate paste pockets extending through said grid next to the bottom strand portion of said frame member and surmounted by a horizontally extending guard rib, said grid being symmetrical with respect to a plane parallel to and medially of the face surfaces of said grid, whereby said guard rib retards the sloughing loss of paste from the lower portion of the grid.

3. In a storage battery, an active paste carrying grid, comprising a molded metal fabrication including vertical and transverse rib elements defining vertically elongate active paste pockets therebetween of substantially equal area, said rib elements being framed within opposite side and top and bottom metal strand portions and substantially bridging the thickness of said strand portions, and a paste guard rib extending substantially parallel to the bottom strand portion of said frame member and spaced therefrom a distance less than one-half the average vertical distance between the other transverse rib elements of said grid, whereby sloughing loss of paste from the grid, is retarded by said guard rib.

4. In a storage battery, in combination, of active paste carrying grid and a mat type paste retainer disposed in bearing relation thereagainst at its opposite sides, said grid comprising a molded metal fabrication including vertical and transverse rib elements defining vertically elongated active paste pockets therebetween, said rib members being framed within opposite side and top and bottom metal strand portions outlining said grid, and a paste guard rib member disposed to substantially bridge the distance between the mats of said retainer and extending substantially parallel to the bottom strand portion a distance substantially one-half of the average vertical distance between the other transverse rib elements whereby said guard rib retards the sloughing loss of paste from the lower portion of the grid.

5. In a storage battery, in combination, an active paste carrying grid and paste retainer having opposite walls disposed in bearing relation against said grid at opposite sides thereof, said grid comprising a molded metal fabrication including vertical and transverse rib elements defining vertically elongate active paste pockets therebetween of substantially equal area, said rib elements being framed within opposite side and top and bottom metal strand portions and substantially bridging said opposite walls, and a paste guard rib located between and substantially bridging said opposite walls of said paste retainer and extending substantially parallel to the bottom strand portion of said frame member and spaced therefrom a distance less than one-half the average distance between the other transverse rib elements of said grid, whereby said guard rib and said paste retainer cooperate to retard the sloughing loss of paste from lower portion of grid.

JOHN L. RUPP.
MARION W. DICKOVER.
EUGENE WILLIHNGANZ.
ALMOND H. SNYDER.

References Cited in the file of this patent

UNITED STATES PATENTS

| Number | Name | Date |
|---|---|---|
| 464,676 | Morrison | Dec. 8, 1891 |
| 1,129,690 | Knobloch | Feb. 23, 1915 |
| 1,376,929 | Ford | May 3, 1921 |
| 1,933,928 | Perkins | Nov. 7, 1933 |

FOREIGN PATENTS

| Number | Country | Date |
|---|---|---|
| 467,696 | Great Britain | June 22, 1937 |
| 508,779 | Germany | Oct. 1, 1930 |